Dec. 8, 1959     D. G. UNTHANK     2,916,058
COLLAPSIBLE TANKS
Filed March 11, 1957
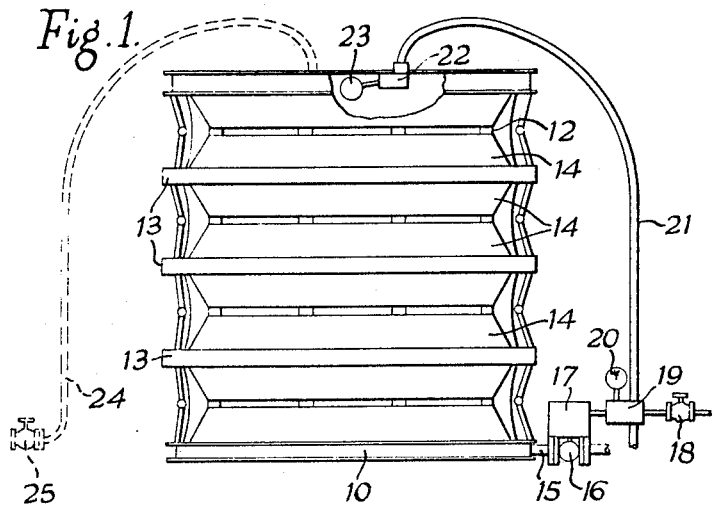
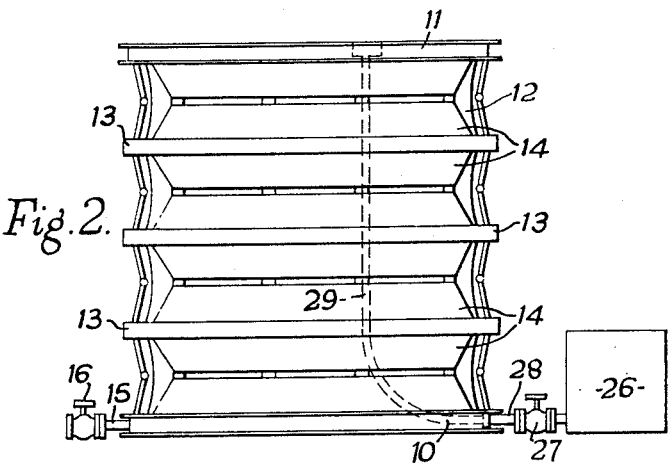
INVENTORS
Douglas G. Unthank
BY
Ralph B. Stewart
ATTORNEY

United States Patent Office 2,916,058
Patented Dec. 8, 1959

2,916,058

COLLAPSIBLE TANKS

Douglas George Unthank, London, England

Application March 11, 1957, Serial No. 645,068

6 Claims. (Cl. 141—48)

The present invention relates to improvements in and relating to collapsible tanks for use on board ship, on road and rail vehicles and aircraft, hereinafter all referred to as vehicles, enabling a vehicle fitted with such a tank to be employed for the transport of liquid by filling the liquid into the tank, or for the transport of dry cargo in the space outside the tank when the tank is in the collapsed condition.

Such tanks are known formed of a rigid base structure and a rigid top usually having straight edges in plan, the rigid base and top being connected together by side walls capable of collapse by folding on defined lines into a plurality of superposed pleats, horizontal frames being provided to define the outer fold lines and further means being provided for establishing the inner fold lines and for maintaining a general parallelism or vertical alignment between the horizontal frames.

The collapsible side walls of the tank are formed of rubber-impregnated fabric or like impervious material providing flexibility.

Such a tank is described in the specification of our earlier British Patent No. 668,188 (U.S. Patent No. 2,623,565).

The collapsible tanks are filled and emptied through a side wall forming a part of the rigid base structure and as near to the bottom of the tank as possible and the filling practice is to pump the liquid into the collapsed tank so that the tank gradually expands. Hitherto, the rigid top has been raised first, for the main part by extension of the uppermost pleated section, followed by extension of the pleated section which is uppermost but one, and so on in approximate succession downwards until finally the lowermost pleated section is extended if the tank is filled.

It has been found however, and particularly with tanks of large capacity and with a large number of pleated sections, that difficulty is encountered in filling the tank completely, due to very high liquid-pumping pressure being required to fully extend the pleated sections at the lower end of the tank with the large head of liquid already in the tank, the pressure being such as to subject the side walls of the tank to undesirably heavy strain often accompanied by sideways wracking or tilting of the tank.

According to the present invention there is provided a method of filling a collapsible tank with a liquid by which the above-mentioned difficulty is overcome, the method comprising first extending the tank by the introduction of gas under pressure and thereafter introducing the liquid whilst maintaining a gas pressure in the tank sufficient to maintain the extended condition of the tank.

Also according to the invention there is provided apparatus for carrying out the method in accordance with the invention, comprising a collapsible tank, means for feeding liquid into the tank and discharging it therefrom and means for feeding gas under pressure into the upper part of the tank and discharging it therefrom.

The arrangement of collapsible tanks embodying the invention will now be described, by way of example, with reference to the accompanying diagrammatic drawing wherein Figures 1 and 2 show respectively two embodiments of the invention.

In the first embodiment shown in Figure 1 a collapsible tank consists of a rigid base 10 and a rigid top 11, the tank being straight sided as seen in plan. The base and the top are connected together by side walls 12 capable of collapse by folding on defined lines into a series of superposed pleats. Horizontal frames 13 are provided to establish the outer fold lines of the side walls 12 and are connected to each other, and to the base and top, by pairs of plates 14 hinged to one another and to their associated frame, or the top or the bottom as the case may be. The plates 14 establish the inner fold lines of the side walls 12, and also maintain the horizontal frames in vertical alignment when the tank is expanded. When the tank is collapsed the frames rest one on the other on the base, with the top resting on the uppermost frame so that the collapsed tank forms a solid structure on to which goods can be loaded, the side walls 12 and the plates 14 being accommodated in the space between the frames, base and top.

The base 10 is provided with a pipe 15 and a shut-off valve 16 through which liquid is introduced into and withdrawn from the tank, the opening and closing of the valve 16 being effected by an electric or mechanical motor 17 (e.g. a solenoid or a hydraulic motor). A gas under pressure, usually air, is fed into the tank through a shut-off valve 18, an adjustable pressure relief valve 19 provided with a pressure indicating gauge 20, and a flexible pipe 21 connected between the valve 19 and an inlet to the tank at the top thereof. The relief valve 19 is set to blow-off on the occurrence in the tank and the pipe 21 of a back pressure somewhat in excess of that required to hold the tank extended, so that expansion of the tank can be initiated by opening the valve 18, and the supply of air to the tank will cease automatically when it is fully extended.

The motor 17 may be made responsive to the attainment of the above-mentioned back pressure in the tank and the pipe 21, so that the motor is automatically operated to open the shut-off valve 16 when the tank has been fully extended, in which case the operation of extending the tank and filling it with liquid can be initiated by opening the gas valve 18. Alternatively, the motor 17 may be made responsive to the attainment of the back pressure so that operation of the motor to open the valve 16 is prevented until the tank has become fully extended and the said back pressure has been reached, the operation of the motor to open the valve 16 being initiated by a separate operation, e.g. under the control of a human operator.

It has been found that quite a low pressure suffices to fully extend the tank and, as an example, it has been found that with an 8 feet square tank having a height of 8 feet when fully extended a pressure of 6–7 lbs. per square inch suffices the inflowing liquid gradually displacing the gas in the tank which flows out of the tank through the pipe 21 and the relief valve 19, the latter maintaining the gas pressure in the tank at the required value while the tank is filled with liquid. On the grounds of economy the gas under pressure that is used for extending the tank will be air, whenever possible, but in some cases, e.g. when air and the vapour of the liquid for filling the tank can form an explosive mixture, it may be preferred to use a gas other than air, for example a relatively inert gas such as nitrogen.

A valve 22 operated for example by a float 23 may be provided inside the tank at the upper end thereof to close off the end of the gas pipe 21 against the entry of liquid when the tank becomes filled, and the valve may include trip means by which the valve can be opened while the tank is still full of liquid. Such trip means are operated when liquid is to be withdrawn from the tank so that gas under pressure can be supplied to the tank as the liquid is withdrawn, and the top of the tank is prevented from dropping as the liquid level falls. With other forms of valve 22 the provision of such trip means may not be necessary.

In another embodiment, a second gas pipe 24 (indicated in Figure 1 by broken lines) is provided between an inlet to the top of the tank and a gas control valve 25 which is operated manually to supply gas under pressure to the tank when it is to be emptied.

In a further embodiment shown in Figure 2 the collapsible tank is the same as that shown in Figure 1, but the valve 16 for admitting liquid to and withdrawing it from the tank is manually operated. Air under pressure can be fed into the tank from a compressor 26 via a manually-operated valve 27, a rigid pipe 28, a flexible pipe 29 within the interior of the tank and a valve 30. The valve 30 is of any conventional type that will permit the passage through it of a gas but not a liquid.

I claim:

1. A collapsible tank comprising a rigid base structure, a rigid top, a flexible side wall connecting said rigid base structure and said rigid top and capable of folding on defined lines into a plurality of superposed pleats, at least one horizontal frame between the said rigid base structure and the said rigid top and connected with said flexible side wall and members hinged to and between said rigid base structure, said horizontal frame and said rigid top and defining the outer fold lines of the said flexible wall, a conduit for conducting gas under pressure into the interior of the tank to raise the rigid top of the tank, at least one conduit through the rigid base structure of the tank for the entry and discharge of liquid into and from the tank and means for venting gas from the tank during entry of liquid into the tank.

2. A collapsible tank as claimed in claim 1 wherein said means for venting gas includes an adjustable relief valve for permitting escape of gas on occurrence of a gas pressure in the tank in excess of that required to maintain the said rigid top raised.

3. A collapsible tank as claimed in claim 1 wherein the said conduit in the rigid base structure for the entry of the liquid includes a valve for controlling the flow of entering liquid, and means responsive to gas pressure in the tank to open said valve to permit flow of entering liquid on occurrence of a given gas pressure in the tank following raising of the said rigid top.

4. A collapsible tank as claimed in claim 3 and including means responsive to gas pressure in the conduit conducting gas under pressure into the tank to prevent opening of the said valve controlling the flow of entering liquid until occurrence of a given gas pressure in the tank following raising of the said rigid top.

5. A collapsible tank comprising a rigid base structure, a rigid top, a flexible side wall connecting said rigid base structure and said rigid top and capable of folding on defined lines into a plurality of superposed pleats, at least one horizontal frame between said rigid base structure and the said rigid top and connected with said flexible side wall, and members hinged to and between said rigid base structure, said horizontal frame and said rigid top and defining the outer fold lines of the said flexible side wall, a conduit for conducting gas under pressure into said tank and having its outlet end secured to the underside of said rigid top, at least one further conduit through the said rigid base structure of the tank for entry and discharge of liquid into and from the tank and a float valve closing said outlet of the said first mentioned conduit on attainment of a given liquid level in the tank following raising of the said rigid top of the tank by the pressure of gas introduced through said first mentioned conduit, to prevent access of liquid to said first mentioned conduit.

6. A collapsible tank as claimed in claim 5 having trip means, and a control therefor external of the tank to permit tripping of the float-operated valve to open the valve in opposition to the buoyancy of the float.

References Cited in the file of this patent

UNITED STATES PATENTS

| | | |
|---|---|---|
| Re. 13,197 | Strasburger | Jan. 17, 1911 |
| 862,231 | Bates | Aug. 6, 1907 |
| 2,356,428 | Ranney | Aug. 22, 1944 |
| 2,811,178 | Cunningham | Oct. 29, 1957 |